US009460150B2

(12) United States Patent
Ochi et al.

(10) Patent No.: US 9,460,150 B2
(45) Date of Patent: Oct. 4, 2016

(54) INFORMATION PROCESSING APPARATUS, DISTRIBUTED PROCESSING SYSTEM, AND DISTRIBUTED PROCESSING METHOD (71) Applicant: FUJITSU LIMITED, Kawasaki-shi (JP)

(72) Inventors: Akira Ochi, Numazu (JP); Yasuo Koike, Numazu (JP); Toshiyuki Maeda, Suntou (JP); Tomonori Furuta, Nagoya (JP); Fumiaki Itou, Kasugai (JP); Tadahiro Miyaji, Nagoya (JP); Kazuhisa Fujita, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 13/740,302

(22) Filed: Jan. 14, 2013

(65) Prior Publication Data
US 2013/0198230 A1 Aug. 1, 2013

(30) Foreign Application Priority Data

Jan. 27, 2012 (JP) .................................. 2012-015693

(51) Int. Cl.
G06F 7/00 (2006.01)
G06F 17/30 (2006.01)
H04L 29/08 (2006.01)

(52) U.S. Cl.
CPC ..... *G06F 17/30424* (2013.01); *H04L 67/1008* (2013.01); *H04L 67/1021* (2013.01); *H04L 67/1097* (2013.01); *H04L 67/288* (2013.01); *H04L 67/2842* (2013.01)

(58) Field of Classification Search
CPC ........... H04L 67/1097; H04L 67/1008; H04L 67/2842; H04L 67/288; H04L 67/1021; G06F 17/30424; G06F 17/30; G06F 3/1245; G06F 3/1215; G06F 3/1247; G06F 3/1288; G06F 12/0292; G06F 12/0802; G06F 2212/01
See application file for complete search history.

(56) References Cited

U.S. PATENT DOCUMENTS 5,944,780 A * 8/1999 Chase et al. .................. 709/201
6,115,790 A * 9/2000 Schimmel ................ G06F 9/52
707/E17.007

(Continued)

FOREIGN PATENT DOCUMENTS

JP 5-143435 A 6/1993
JP H7-182220 7/1995

(Continued)

OTHER PUBLICATIONS

Shafer, Jeffery et al., "The Hadoop Distributed Filesystem: Balancing Portability and Performance," Performance Analysis of System & Software (ISPASS), IEEE International Symposium, Mar. 28, 2010, pp. 122-133, XP031671772.

(Continued)

Primary Examiner — Azam Cheema
(74) Attorney, Agent, or Firm — Fujitsu Patent Center (57) ABSTRACT An information processing apparatus includes a receiving unit that receives an access request for data from one of a plurality of information processing apparatuses in a distributed processing system in which the information processing apparatuses execute a process in a distributed manner, a query issuing unit that issues, when the access request for the data is received by the receiving unit, a query to each of the information processing apparatuses as to whether the data is stored in a page cache managed by an operating system on each of the information processing apparatuses, and a responding unit that makes a response to the access request, the response specifying, as an access destination, an information processing apparatus that has responded to the query issued by the query issuing unit.

2 Claims, 9 Drawing Sheets (56) References Cited

U.S. PATENT DOCUMENTS

| | | | | |
|---|---|---|---|---|
| 6,330,606 | B1* | 12/2001 | Logue | G06F 8/65 |
| | | | | 348/E5.105 |
| 6,823,048 | B2* | 11/2004 | Gillespie | 379/88.19 |
| 7,953,083 | B1 | 5/2011 | Evans et al. | |
| 2004/0250020 | A1* | 12/2004 | Kuwata | 711/114 |
| 2005/0114403 | A1* | 5/2005 | Atchison | G06F 17/30893 |
| 2012/0159072 | A1* | 6/2012 | Hida et al. | 711/119 |
| 2012/0317366 | A1* | 12/2012 | Sato et al. | 711/141 |
| 2014/0258366 | A1* | 9/2014 | L'Heureux | H04L 29/08 |
| | | | | 709/203 |

FOREIGN PATENT DOCUMENTS

| | | |
|---|---|---|
| JP | 11-15718 | 1/1999 |
| JP | 2005-234919 | 9/2005 |

OTHER PUBLICATIONS

Shvachko, Konstantin, "The Hadoop Distributed File System," Mass Storage Systems and Technologies (MSST), IEEE 26$^{th}$ Symposium, May 3, 2010, pp. 1-10, XP031698650.
Extended European Search Report dated Jun. 11, 2013 for corresponding European Application No. 12195821.9.
Chinese Office Action mailed Jul. 22, 2015 for corresponding Chinese Patent Application No. 201210575905.2 , with English Translation, 12 pages.
Japanese Office mailed Jun. 16, 2015 for corresponding Japanese Patent Application No. 2012-015693 , with English Translation, 4 pages.
Chinese Office Action mailed Mar. 1, 2016 for corresponding Chinese Patent Application 201210575905.2, with English Translation, 21 pages.

\* cited by examiner

INFORMATION PROCESSING APPARATUS, DISTRIBUTED PROCESSING SYSTEM, AND DISTRIBUTED PROCESSING METHOD

CROSS-REFERENCE TO RELATED APPLICATION

This application is based upon and claims the benefit of priority of the prior Japanese Patent Application No. 2012-015693, filed on Jan. 27, 2012, the entire contents of which are incorporated herein by reference.

FIELD

The embodiments discussed herein are related to an information processing apparatus, a distributed processing system, and a distributed processing method.

BACKGROUND

Conventional distributed processing frameworks, such as Hadoop, which uses multiple nodes, are known as a distributed processing technology for processing large amounts of data at high speed. Hadoop divides a file and stores the divided files in multiple nodes and allows, in parallel, each node that manages a divided file to execute a processing instruction, thereby executing distributed processing.

The Hadoop distributed file system (HDFS) is used as the base of the Hadoop data structure. The HDFS is a double structured file system that provides namespaces that are unified among multiple nodes; however, data is managed, in practice, by a double structured file system using a local file system in each node. Specifically, the HDFS is a double structured file system constituted by a user layer application that manages name spaces and an operating system that manages input and output of physical files.

Figure 9:
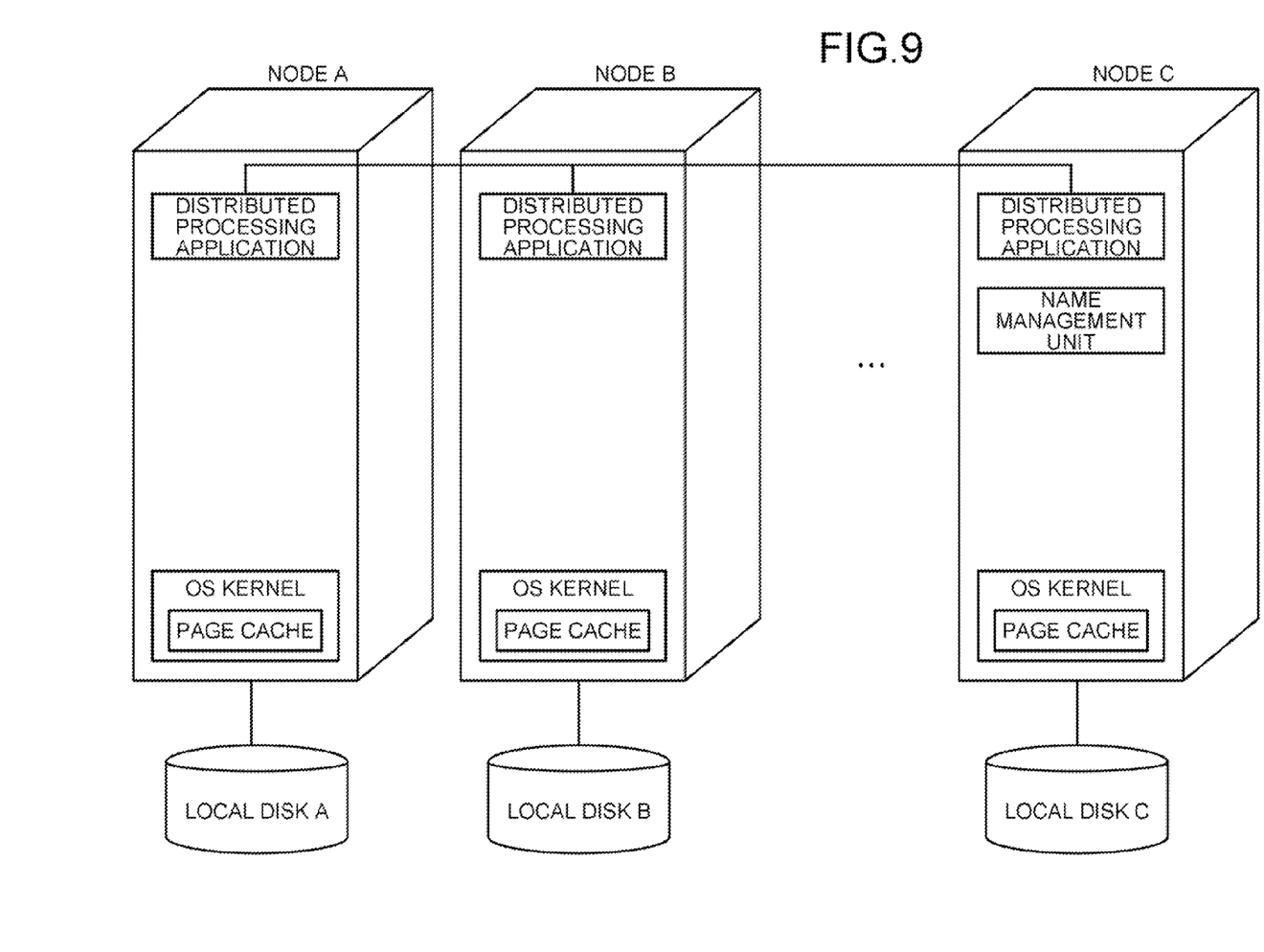
FIG. 9 is a schematic diagram illustrating an example of the overall configuration of a conventional distributed processing system.

FIG. 9 is a schematic diagram illustrating an example of the overall configuration of a conventional distributed processing system. The distributed processing system illustrated in FIG. 9 includes three nodes, i.e., a node A, a node B, and a node C. An application that uses a distributed processing framework is executed in each of the nodes. The node A is connected to a local disk A, the node B is connected to a local disk B, and the node C is connected to a local disk C. The node C is the master node that executes name management that manages which file is stored in which local disk.

The distributed processing system described above creates a duplicate of a file and stores therein the original file and the duplicate file. For example, in the distributed processing system, if a file C is stored in the node C, a duplicate file C, which is a duplicate of the file C, is also stored in the node B or the node A. In this way, the distributed processing system implements file redundancy.

In the following, a processing example will be specifically described by using, as an example, a reference process that is part of distributed processing. At this point, it is assumed that an application A executed by the node A requests the node C to refer to a file A. In such a case, the node C specifies, using the name management, that the file A is stored in both the local disk B and the local disk C. Then, the node C responds to the application A that the local disk B, which is closer to the node A, which is the request source, is to be used as the storage destination of the file A. The application A, which receives a response, requests that the node B connected to the local disk B reads the file A and then refers to the file A that is read from the local disk B.

Furthermore, in the distributed processing system, files are managed in a memory area reserved for an application by each node. When an application makes a request for a file to be referred to, the subject file is read from the memory, which makes it possible to reduce the processing time.

Patent Document 1: Japanese Laid-open Patent Publication No. 2005-234919
Patent Document 2: Japanese Laid-open Patent Publication No. 11-15718
Patent Document 3: Japanese Laid-open Patent Publication No. 07-182220

However, with the distributed processing system described above, there is a problem in that the processing performance is not improved because page caches managed by an OS kernel are not efficiently used and thus an input/output of a local disk occurs.

For example, if distributed processing occurs in the distributed processing system illustrated in FIG. 9, the node C determines that the file to be processed is the file that is stored in the local disk that is the closest to the request source node from among local disks that stores therein the file to be processed. Accordingly, there may be a case in which, instead of a node that stores the subject file in a page cache that is managed by the OS kernel, a node that does not store the subject file in a page cache managed by the OS kernel is requested to process the subject file.

In such a case, the node that is requested to process the file reads the file from a local disk whose processing speed is lower than that of the page cache that is managed by the OS kernel. In other words, in terms of the entire distributed processing system, even when a file stored in the page cache managed by the OS kernel is the file to be read, the file may sometimes be read by executing an input/output process of a low-speed disk.

Furthermore, the node that has executed input/output processing of the low-speed disk stores the file read front the local disk in the page cache managed by the OS kernel. At this point, after discarding other files from the page cache managed by the OS kernel, the node caches the read file, resulting in the reduction of the cache hit rate of the other files.

As described above, with the conventional distributed processing system, a page cache is not efficiently used, and thus it is difficult to improve the processing performance. Furthermore, a method for improving the throughput by storing data in a memory area reserved for an application is impractical because a large volume of files needs to be stored in the memory.

SUMMARY

According to an aspect of an embodiment, an information processing apparatus includes a receiving unit that receives an access request for data from one of a plurality of information processing apparatuses in a distributed processing system in which the information processing apparatuses execute a process in a distributed manner, a query issuing unit that issues, when the access request for the data is received by the receiving unit, a query to each of the information processing apparatuses as to whether the data is stored in a page cache managed by an operating system on the each of the information processing apparatuses, and a responding unit, that makes a response to the access request, the response specifying, as an access destination, an information processing apparatus that has responded to the query issued by the query issuing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The present invention is not limited to the embodiments.

[a] First Embodiment

Overall Configuration

Figure 1:
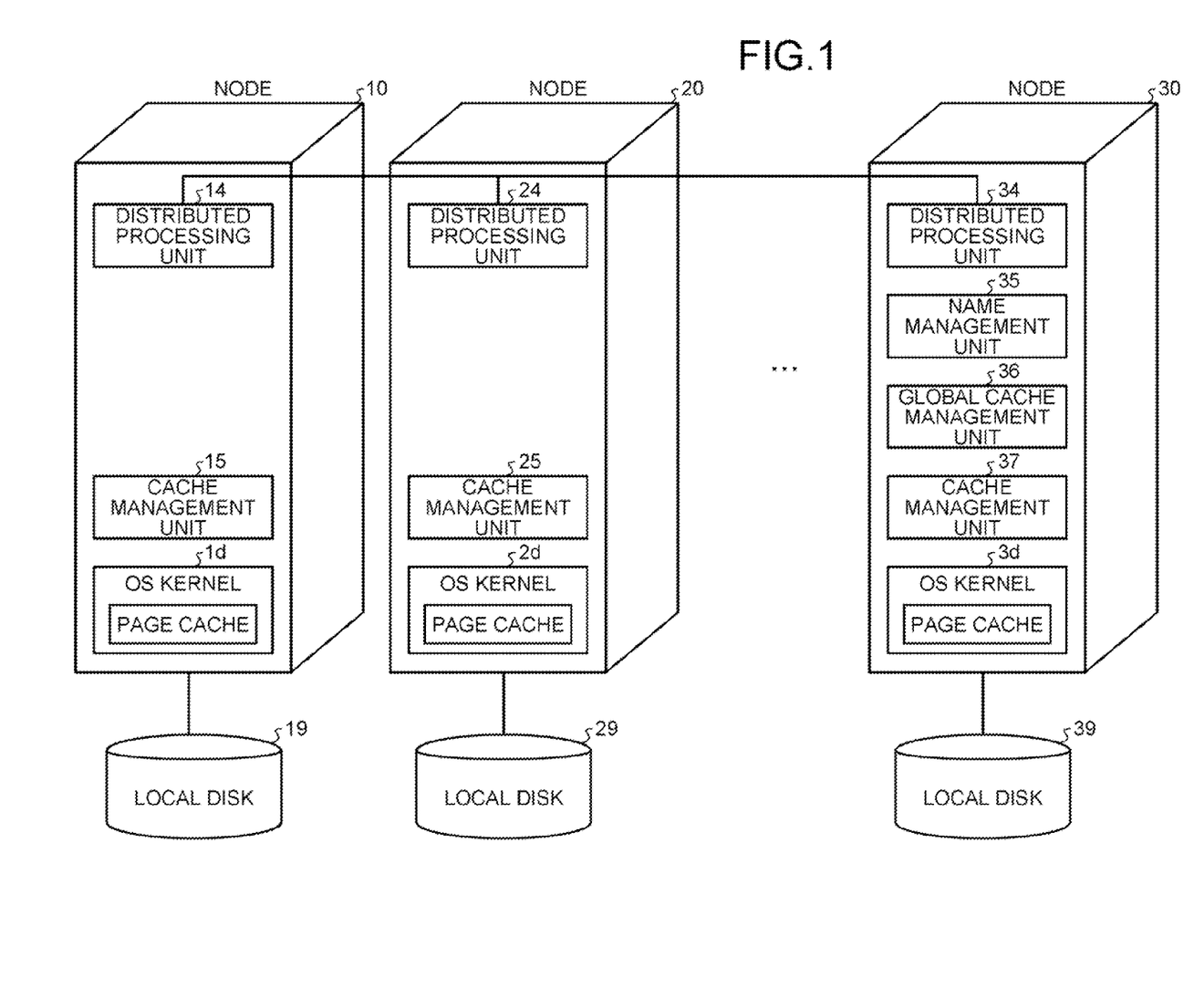
FIG. 1 is a schematic diagram illustrating an example of the overall configuration of a distributed processing system according to a first embodiment.

FIG. 1 is a schematic diagram illustrating an example of the overall configuration of a distributed processing system according to a first embodiment. As illustrated in FIG. 1, the distributed processing system is constituted by multiple nodes. FIG. 1 illustrates a node 10, a node 20, and a node 30. These nodes are connected to each other via, for example, a network. Furthermore, the number of nodes can be arbitrarily set. In the embodiment, a description will be given by using a file as an example; however, the embodiment is not limited thereto. For example, various types of data may also be used.

In the distributed processing system, a distributed processing application that uses a distributed processing framework, such as Hadoop, is executed in each node and the HDFS or the like is used as the base of the data structure. Furthermore, in the distributed processing system, a duplicate file is created and stored in addition to the file. Furthermore, in the distributed processing system, a large file is divided into files with a predetermined size and the obtained divided files, which corresponds to a part of the original file, are distributed to and stored in the nodes.

The node 10, the node 20, and the node 30 constituting such a distributed processing system are nodes that execute distributed processing by cooperating with the other nodes. As illustrated in FIG. 1, the node 10 is connected to a local disk 19, includes a distributed processing unit 14 and a cache management unit 15, and executes a page cache in an Operating System (OS) kernel 1d. The local disk 19 stores therein, for example, the file described above, a part of the file, and a duplicate file. The distributed processing unit 14 executes a distributed processing application that uses a distributed processing framework and executes distributed processing by cooperating with the other nodes.

The node 20 has the same configuration as the node 10. Specifically, the node 20 is connected to a local disk 29, includes a distributed processing unit 24 and a cache management unit 25, and executes a page cache in an OS kernel 2d. The local disk 29 stores therein, for example, the file described above, a part of the file, and a duplicate file. The distributed processing unit 24 executes a distributed processing application that uses a distributed processing framework and executes distributed processing by cooperating with the other nodes.

The node 30 is the master node that executes name management of the distributed processing system, in addition to the configuration or the function of the node 10 or the node 20. The node 30 is connected to a local dish 39; includes a distributed processing unit 34, a name management unit 35, a global cache management unit 36, and a cache management unit 37; and executes a page cache in an OS kernel 3d. Similarly to the local disk 29, the local disk 39 stores therein, for example, the file described above, a part of the file, and a duplicate file. Furthermore, information stored in each local disk is not always the same. The distributed processing unit 34 executes a distributed processing application that uses a distributed processing framework and executes distributed processing by cooperating with the other nodes. The name management unit 35 manages which data is stored in a local disk in which node. The global cache management unit 36 is a processing unit that queries as to whether a file to be processed is cached. The OS kernel 1d, the OS kernel 2d, and the OS kernel 3d in the node 10, the node 20, and the node 30, respectively, constitute a part of the OS and are software functioning as the core of the OS. The OS kernel 1d, the OS kernel 2d, and the OS kernel 3d each manage the system resources and manage the exchange of software components and hardware.

If a processing request for a file occurs in the distributed processing system, the requested process is executed in the node that stores therein the file to be processed. Then, the node that has executed the process responds to the node, i.e., the processing request source, by sending the execution result. Furthermore, if a processing request for a file, which is obtained by being divided and stored in the distributed processing system, occurs, the requested process is executed in each node that stores therein the divided file and then the results of the processes are sent in response to the node, i.e., the request source.

In the following, a case in which the node 10 makes a reference request for a file will be described. If a file is accessed due to an application being executed, the distributed processing unit 14 in the node 10 transmits an access request for the file to the node 30, which corresponds to the master node. If the access request is received by the distributed processing unit 34 in the node 30, the global cache management unit 36 in the node 30 executes a query of each node as to whether the file to be accessed is stored in a page cache that is managed by the corresponding OS kernel. At this point, the global cache management unit 36 executes the query on the nodes including its own node.

Subsequently, in each of the cache management units in the corresponding node that has received the query, cache management is executed, in which it is determined, by referring to the page cache managed by the corresponding OS kernel, whether a file to be accessed is stored in the page cache managed by the OS kernel. Then, each node responds to the node 30 by informing it whether a cache nit has occurred.

Then, the global cache management unit 36 in the node 30 responds to the node 10, which is the request source, via the distributed processing unit 34 by sending information that specifies the node, which responds to the query by sending information indicating that file data is stored in the page cache managed by the OS kernel. An example of the information that specifies a node includes an Internet Protocol (IP) address.

Thereafter, the distributed processing unit 14 in the node 10 transmits a reference request for the file to the node that is notified by the node 30. The node that has received the reference request reads the file from the page cache managed by the OS kernel and responds to the node 10. Consequently, the application executed by the node 10 can refer to the file.

As described above, the master node in the distributed processing system makes a query of each node as to whether a requested file is stored in a page cache managed by the corresponding OS kernel. Then, the master node responds to the request source by informing the node that caches data; therefore, the page cache managed by the OS kernel is efficiently used and thus the processing performance cam be improved.

Configuration of the Master Node

In the following, a description will be given of the master node that constitutes the distributed processing system. In FIG. 1, because the node 30 that executes the name management is the master node, the node is referred to as the master node 30 in the description below.

Figure 2:
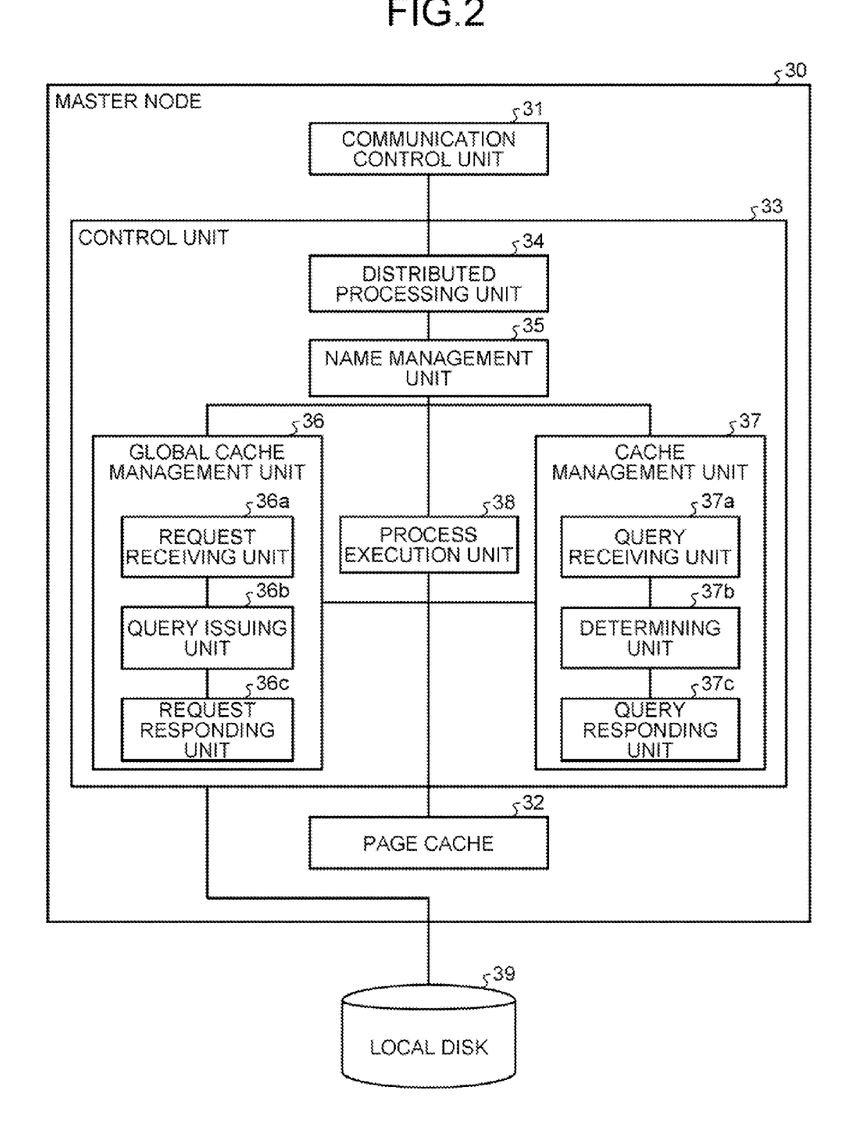
FIG. 2 is a functional block diagram illustrating the configuration of a master node in the distributed processing system according to the first embodiment.

FIG. 2 is a functional block diagram illustrating the configuration of a master node in the distributed processing system according to the first embodiment. As illustrated in FIG. 2, the master node 30 includes a communication control unit 31, a page cache 32, and a control unit 33, which are connected to the local disk 39. The processing unit illustrated in FIG. 2 is only an example; therefore, the embodiment is not limited thereto.

The communication control unit 31 is a processing unit that controls communication with other nodes and is, for example, a network interface card. For example, the communication control unit 31 receives, from the other nodes, various requests, such as an access request or a reference request. Furthermore, the communication control unit 31 transmits, to the other nodes, responses to the various requests.

The page cache 32 is a storage device that stores therein data that is used by a program or various applications executed by the control unit 33. Furthermore, the page cache 32 stores, for example, data read from the local disk 39 by the application executed by the control unit 33. Specifically, the page cache 32 caches a file. Various known methods, such as a Least Recently Used (LRU) method, can be used for the method for controlling a cache; therefore, a description thereof will be omitted here.

The control unit 33 is a processing unit that manages the entire process performed by the master node 30 and that executes an application or the like. The control unit 33 is an electronic circuit, such as a central processing unit (CPU). The control unit 33 includes the distributed processing unit 34, the name management unit 35, the global cache management unit 36, the cache management unit 37, and a process execution unit 38.

The distributed processing unit 34 is a processing unit that executes a distributed processing application using a distributed processing framework and that executes, by cooperating with the other nodes, the distributed processing. The distributed processing unit 34 cooperates with the other nodes that execute the distributed processing and various processing units included in the master node 30. For example, the distributed processing unit 34 outputs various requests received from the other nodes to the various processing units via the name management unit 35. Furthermore, the distributed processing unit 34 outputs the processing results output from the various processing units to the other node that is the request source via the name management unit 35.

The name management unit 35 is a processing unit that manages data stored in a local disk in each node. For example, the name management unit 35 executes the name management by using a file management table in which an identifier for identifying a node is associated with information for identifying data stored in a local disk in each node. Furthermore, the name management unit 35 executes node management by using an address management table in which an identifier for identifying each node is associated with an IP address used by each node. The file management table and the address management table are stored in a storing unit, such as a memory or a hard disk (not illustrated).

The global cache management unit 36 is a processing unit that includes a request receiving unit 36a, a query issuing unit 36b, and a request responding unit 36c and that manages, by using these units, a state of a cache in each node. The request receiving unit 36a is a processing unit that receives an access request for a file from a node that constitutes the distributed processing system. The request receiving unit 36a receives an access request, which is transmitted by its own node or the other nodes via the distributed processing unit 34 and the name management unit 35, and outputs the access request to the query issuing unit 36b.

When the request receiving unit 36a receives an access request for a file, the query issuing unit 36b is a processing unit that issues a query to each node as to whether a page cache managed by an OS kernel stores therein the requested file. In the example illustrated in FIG. 1, if the node 10 transmits an access request for the file A, the query issuing unit 36b issues queries to the node 10, the node 20, and the node 30.

The request responding unit 36c is a processing unit that responds to the access request source node by sending information for specifying the node that responds to the query from the query issuing unit 30b by sending information indicating that the file is stored in a page cache managed by an OS kernel. In the example described above, when the request responding unit 36c receives a response from the node E indicating that the file A is cached, the request responding unit 36c responds to the node A, which is the request source, via the distributed processing unit 34 and the name management unit 35 by sending the IP address of the node 8, i.e., IP address information that is used by the query issuing unit 36b at the time of query.

Furthermore, if multiple nodes have responded indicating that the file is stored in the page cache managed by the OS kernel, the request responding unit 36c responds by indicating the IP address of the node that is the closest to the request source node as the access destination. For example, the request responding unit 36c creates a topology of the distributed processing system and responds by indicating the IP address of the node in which the number of hops to the request source is the lowest. Furthermore, the request responding unit 36c may also previously determine the order of priority for the nodes and specify the node that responds to the request source. Furthermore, in addition to the previously determined information, the order of priority may also be flexibly determined by referring to dynamic load information.

A description will be given here by referring back to FIG. 2. The cache management unit 37 is a processing unit that includes a query receiving unit 37a, a determining unit 37b, and a query responding unit 37c and determines, by using these units, the state of a cache of file data. The query receiving unit 37a is a processing unit that receives, from the master node 30 in the distributed processing system, a query as to whether a file to be accessed is stored in a page cache managed by an OS kernel. In the case of the master node 30, the query receiving unit 37a receives a query from the global cache management unit 36 that is included in the same nods and outputs the received query to the determining unit 37b.

The determining unit 37b is a processing unit that determines, by referring to the page cache 32 in its own node when a query is received by the query receiving unit 37a, whether the queried file is stored in the page cache 32. Specifically, the determining unit 37b determines whether the queried file is cached and outputs the determination result to the query responding unit 37c. For example, if the entire file is the target of the query, the determining unit 37b refers to the page cache 32 and determines whether the entire file is stored in the page cache 32.

Furthermore, if a part of the file is stored in the page cache 32, the determining unit 37b determines whether the file is cached in accordance with the stored page number. Specifically, the determining unit 37b calculates the total number of pages from the file size. If the ratio of the number of pages stored in the page cache 32 to the total number of pages is equal to or greater than a predetermined value, the determining unit 37b determines that the file is stored in the page cache. For example, by using the inode (index node: a unique identifier of the file and the directory) of the queried file as a key, the determining unit 37b acquires the number of page caches (Pc) from the OS kernel. Furthermore, the determining unit 37b calculates the total number of pages (Pa) of the file by using "the whole size of the file (byte) ÷4096". Then, if the calculated value is greater than a predetermined value "R (%)" obtained by "(Pc×100)/Pa", the determining unit 37b determines that the file is stored in the page cache.

The query responding unit 37c responds to the query source node by sending the result determined by the determining unit 37b. In the case of the master node 30, the query responding unit 37c outputs, as the result determined by the determining unit 37b, information indicating that the file is cached or indicating that the file is not cached to the global cache management unit 36.

The process execution unit 38 is a processing unit that executes the distributed processing occurring in the distributed processing received via the distributed processing unit 34 or occurring in its own node. For example, if a reference request for a file is received, the process execution unit 38 searches the page cache 32 by using the file name or the inode contained in the reference request as a key. If the subject file is present in the page cache 32, the process execution unit 33 reads the subject file from the page cache 32 and transmits the file to the request source node. In contrast, if the subject file is not present in the page cache 32, the process execution unit 38 reacts the subject file from the local disk 39 and transmits the file to the request source node.

Configuration of the Node

In the following, a description will be given of nodes other than the master node from among the nodes constituting the distributed processing system. The nodes described below are the node 10 and the node 20 illustrated in FIG. 1. The node 10 and the node 20 have the same configuration; therefore, only the node 10 will be described below as an example.

Figure 3:
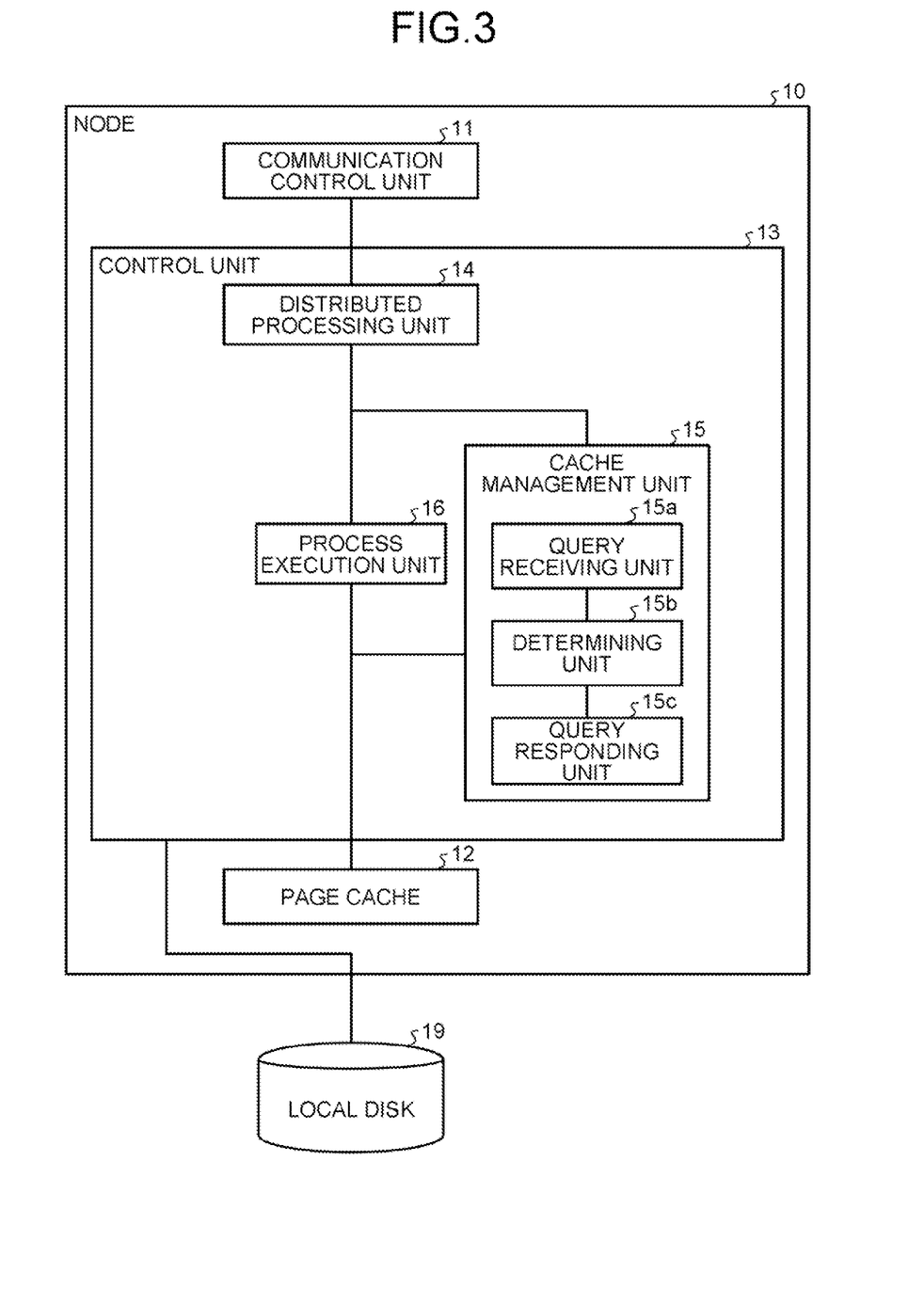
FIG. 3 is a functional block diagram illustrating the configuration of a node in the distributed processing system according to the first embodiment.

FIG. 3 is a functional block diagram illustrating the configuration of a node in the distributed processing system according to the first embodiment. As illustrated in FIG. 3, the node 10 includes a communication control unit 11, a page cache 12, and a control unit 13, which are connected to the local disk 19. The processing units illustrated in FIG. 3 are only examples; therefore, the embodiment is not limited thereto.

The communication control unit 11 is a communication interface that controls communication with other nodes and is, for example, a network interface card. For example, the communication control unit 11 receives, from the other nodes, various requests, such as reference requests. Furthermore, the communication control unit 11 transmits, to the other nodes, responses to the various requests.

The page cache 12 is a storage device that stores therein data that is used by a program or various applications executed by the control unit 13. Furthermore, the page cache 12 stores therein, for example, data read from the local disk 19 by the application executed by the control unit 13.

The control unit 13 is a processing unit that manages the entire process performed by the node 10 and that executes an application or the like. For example, the control unit 13 is an electronic circuit, such as a CPU. The control unit 13 includes the distributed processing unit 14, the cache management unit 15, and a process execution unit 16. Similarly to the distributed processing unit 34 illustrated in FIG. 2, the distributed processing unit 14 is a processing unit that executes a distributed processing application using the distributed processing framework and that executes the distributed processing by cooperating with the other nodes. The distributed processing unit 14 receives an access request or a reference request from the master node or from the other nodes and outputs the received request to the various processing units. Furthermore, the distributed processing unit 14 transmits, to a subject node, a response or a processing result output from a processing unit.

The cache management unit 15 executes the same process as that performed by the cache management unit 37 illustrated in FIG. 2; therefore, a description thereof in detail will be omitted here. It is noted that a query receiving unit 15a, a determining unit 15b and a query responding unit 15c correspond to the query receiving unit 37a, the determining unit 37b and the query responding unit 37c, respectively. Moreover, a query source is not its own node but is the master node, which is different from the configuration illustrated in FIG. 2. Accordingly, the destination to which the cache management unit 15 responds is the master node.

Furthermore, the process execution unit 16 executes the same process as that performed by the process execution unit 36 illustrated in FIG. 2; therefore, a detailed description thereof will be omitted here.

Flow of a Process

Figure 6:
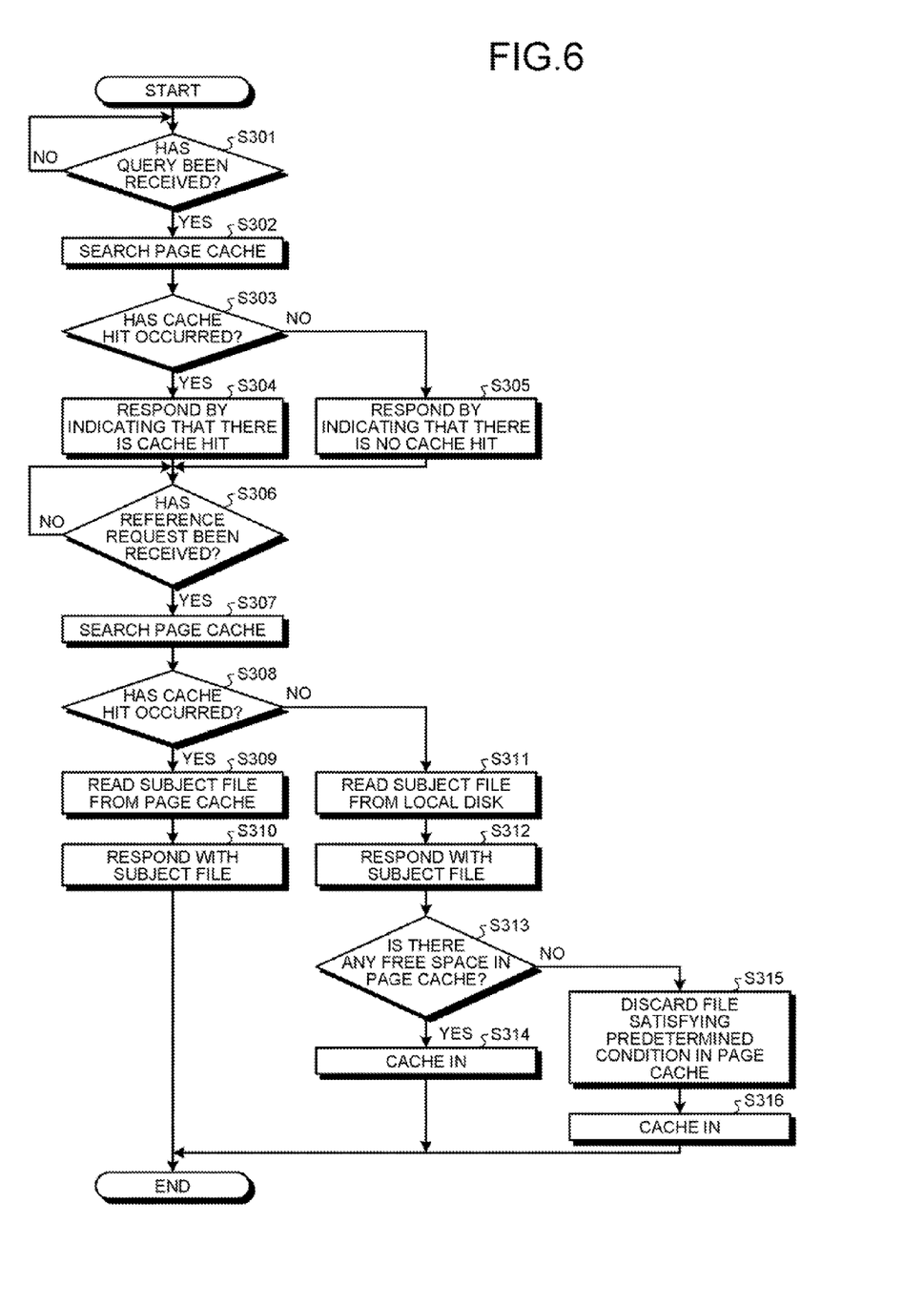
FIG. 6 is a flowchart illustrating the flow of a process executed by each node according to the first embodiment.

In the following, the flow of various processes executed by the distributed processing system will be described. In the description below it is assumed in the example that the reference request source node is the node 10 and that the master node is the node 30. The master node executes the same process as that executed by the node 10. Furthermore, the flow of the process illustrated in FIG. 4 or 6 is also executed by the node 30.

Request Source Node

Figure 4:
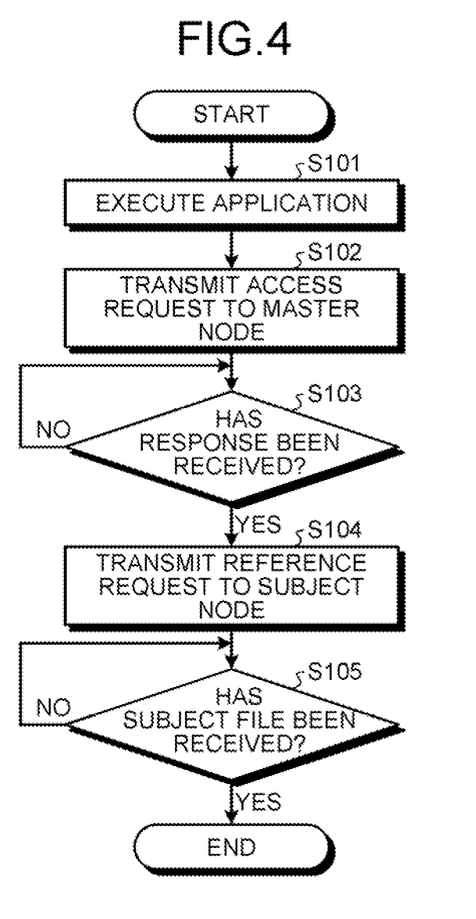
FIG. 4 is a flowchart illustrating the flow of a process executed by a request source node according to the first embodiment.

FIG. 4 is a flowchart illustrating the flow of a process executed by a request source node according to the first embodiment. As illustrated in FIG. 4, when an application is executed in the node 10 and a file is accessed (Step S101), the distributed processing unit 14 transmits an access request for a file to the master node (Step S102).

Then, when the distributed processing unit 14 receives a response from the master node (Yes at Step S103), the process execution unit 16 transmits a reference request for the file to the IP address of the node to which a response was made (Step S104).

Then, when the process execution unit 16 receives the file from the node that has transmitted the reference request (Yes at Step S105), the process execution unit 16 refers to the file and continues executing the application executed at Step S101.

Master Node

Figure 5:
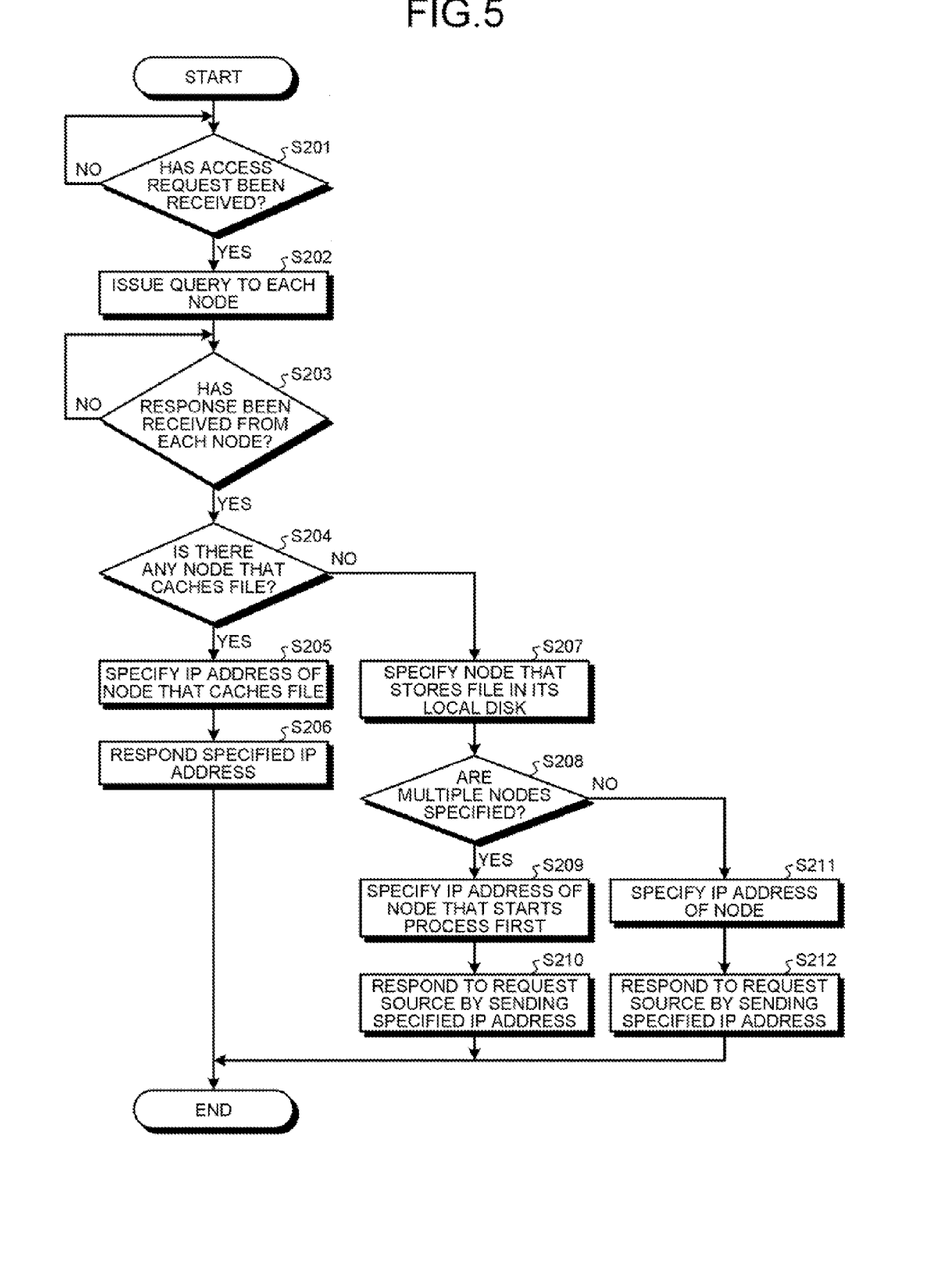
FIG. 5 is a flowchart illustrating the flow of a process executed by the master node according to the first embodiment.

FIG. 5 is a flowchart illustrating the flow of a process executed by the master nods according to the first embodiment. As illustrated in FIG. 5, when the request receiving unit 36a in the node 30 receives an access request via the distributed processing unit 34 (Yes at Step S201), the query issuing unit 36b issues a query to each node as to whether the file is cached (S202).

Thereafter, when the request responding unit 36c receives a response from the node that has executed the query (Yes at Step S203), the request responding unit 36c determines whether a node that caches the file is present (Step S204).

If the request responding unit 36c determines that a node that caches the file is present (Yes at Step S204), the request responding unit 36c specifies the IP address of the node stored in the page cache managed by the OS kernel by using the IP address that is used for the query executed at Step S202 (Step S205). Then, the request responding unit 36c responds to the request source node by using the specified IP address as the access destination (Step S206). At this point, if the request responding unit 36c determines that multiple nodes cache the file, the request responding unit 36c responds to the request source by sending the IP address of the node in which the process starts first.

In contrast, if the request responding unit 36c determines that no node that caches the file is present (No at Step S204), the request responding unit 36c specifies, by using the name management unit 35 or the like, the node that stores the file in its local disk (Step S207).

If there are multiple specified nodes (Yes at Step S208), the request responding unit 36c specifies the IP address of the node that starts the process first by using, for example, the name management unit 35 (Step S209) and responds to the request source node (Step S210).

In contrast, if there is no multiple specified nodes (No at Step S208), the request responding unit 36c specifies the IP address of the node that stores therein the file specified by using the name management unit 35 or the like (Step S211) and responds to the request source node (Step S212).

Each Node

FIG. 6 is a flowchart illustrating the flow of a process executed by each node according to the first embodiment. In the following, a description will be given of the node 20 as an example. The way reference numerals are assigned to each of the processing units in the node 20 is the same as that for the node 10, e.g., the distributed processing unit 24 in the node 20.

As illustrated in FIG. 6, when a query receiving unit 25a in the node 20 receives a query from the master node 30 (Yes at Step S301), a determining unit 25b searches a page cache 22 (Step S302) and determines whether a cache hit has occurred (Step S303).

If a cache hit has occurred (Yes at Step S303), a query responding unit 25c responds to the master node 30 by indicating that there is a cache hit (Step S304). In contrast, if a cache hit does not occur (No at Step S303), the query responding unit 25c responds to the master node 30 by indicating that there is no cache hit (Step S305).

Thereafter, when the distributed processing unit 24 receives a reference request for a file (Yes at Step S306), a process execution unit 26 refers to the page cache 22 and determines whether the file is present in the page cache 22 (Step S307). If the reference request for the file is not received, the process ends.

If a cache hit has occurred (Yes at Step S308), the process execution unit 26 reads the file from the page cache 22 (Step S309) and responds to the reference request source node by sending the file (Step S310).

In contrast, if a cache hit does not occur (No at Step S308), the process execution unit 26 reads the file from the local disk 29 (Step S311) and responds to the reference request source node indicating the file (Step S312).

If there is a free space in the page cache 22 (Yes at Step S313), the process execution unit 26 executes the cache in the file to which a response was made (Step S314). Specifically, the process execution unit 26 stores the file, which is read from the local disk 29, in the free space in the page cache 22.

In contrast, there is no free space in the page cache (No at Step S313), after the process execution unit 26 executes the cache out the file (Step S315), the process execution unit 26 executes the cache in the file to which a response was made (Step S316). Specifically, the process execution unit 26 discards the file that satisfies the predetermined condition from the page cache 22 and then stores the file, which is read from the local disk 29, in an area in which the discarded file was stored. Various known methods, such as a Least Recently Used (LRU) method, can be used to set the condition.

As described above, the distributed processing system illustrated in FIG. 1 can efficiently use a page cache in an operating system without using a dedicated cache management function for each application even when a conventional application is used. Specifically, with the distributed processing system illustrated in FIG. 1, if any one of the nodes caches a subject file, a page cache can always be used in the distributed processing. Accordingly, it is possible to reduce the I/O process for reading a file from a local disk and to enhance high-speed memory access, thereby improving the processing performance.

[b] Second Embodiment

In the above explanation, a description has been given of the embodiment according to the present invention; however, the embodiment is not limited thereto and the present invention can be implemented with various kinds of embodiments other than the embodiment described above. Therefore, another embodiment will be described below.

Shared Disk

Figure 7:
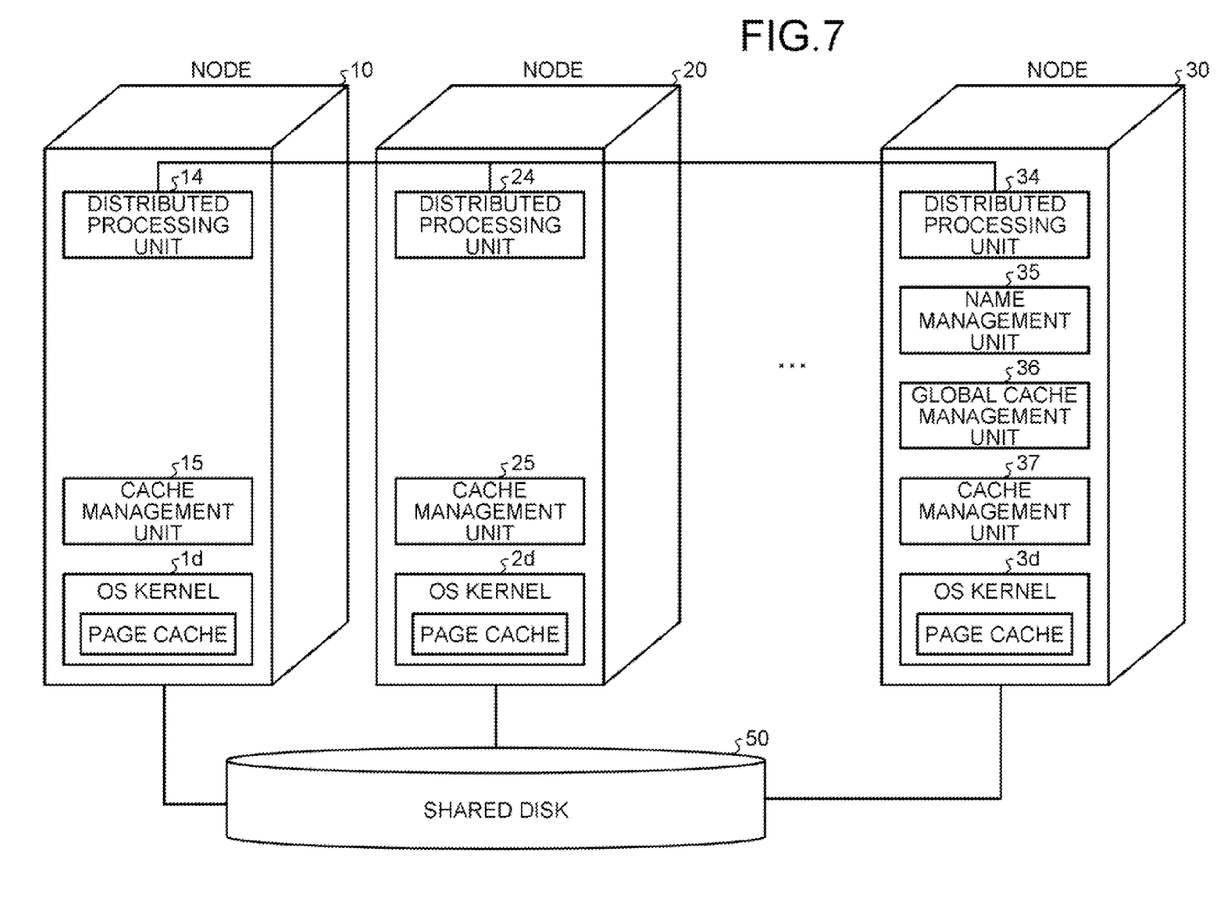
FIG. 7 is a schematic diagram illustrating an example of the overall configuration of the distributed processing system when a shared disk is used.

In the first embodiment, a description has been given of a case in which each node includes a local disk; however, the embodiment is not limited thereto. For example, each node may also be connected to a shared disk. FIG. 7 is a schematic diagram illustrating an example of the overall configuration of the distributed processing system when a shared disk is used. As illustrated in FIG. 7, each node has the same configuration as that described in the first embodiment. A second embodiment differs from the first embodiment in that the disk connected to each node is a shared disk 50 instead of the local disk.

Even in the case illustrated in FIG. 7, each node has the same function as that performed in the first embodiment and executes the same process. Specifically, each node specifies the node that caches the target data in a page cache managed by an OS kernel and the specified node reads the subject file from the page cache managed by the OS kernel. When the shared disk is used, data can be accessed from any of the servers at the same cost. Accordingly, a cache hit can be made when the writing and the reading of data are continuously performed. Consequently, when compared with the first embodiment, the probability of a cache hit can be improved and thus the processing performance can be improved.

Configuration of the Node

In the first embodiment, a description has been given of a case in which each node is constituted by a single server; however, the embodiment is not limited thereto. For example, each node may also be constituted by multiple rack mount servers or constituted by a single server that includes multiple system boards. For example, a single node may also be constituted by three rack mount servers: a rack mount server that includes the distributed processing unit 34, the name management unit 35, and the process execution unit 38; a rack mount server that includes the global cache management unit 36; and a rack mount server that includes the cache management unit 37. Furthermore, a single node may also be a server that includes multiple system boards and each system board may also execute a single processing unit. Furthermore, a local disk may also be arranged inside each node or arranged outside the node.

Processing Content

In the first embodiment, a description has been given of a reference process as an example; however, the embodiment is not limited thereto. For example, a write process or the like may also be performed in a similar manner to that described above. Furthermore, a node that stores therein the subject file may sometimes execute a write process, an update process, or the like because the distributed processing framework is used. Furthermore, if a file to be processed is divided and stored in multiple nodes, each node that stores therein a part of the file executes a process in parallel. Then, the master node batches the each process and responds to the request source. A typical method can be used for determining a master node. For example, a node that is the closest to the request source is determined to be the master node.

System

Of the processes described in the embodiments, the whole or a part of the processes that are mentioned as being automatically performed can also foe manually performed, or the whole or a part of the processes that are mentioned as being manually performed can also foe automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the global cache management unit 36 can be integrated with the cache management unit 37. Furthermore, all or any part of the processing functions performed by each device can be implemented by a CPU and by programs analysed and executed by the CPU or implemented as hardware by wired logic.

Hardware Configuration

The various processes performed in the embodiments described above can be implemented by a program prepared in advance and executed by a computer system such as a personal computer or a workstation. Accordingly, in the following, a computer system that executes the program having the same function as that described in the above embodiments will be described as an example.

Figure 8:
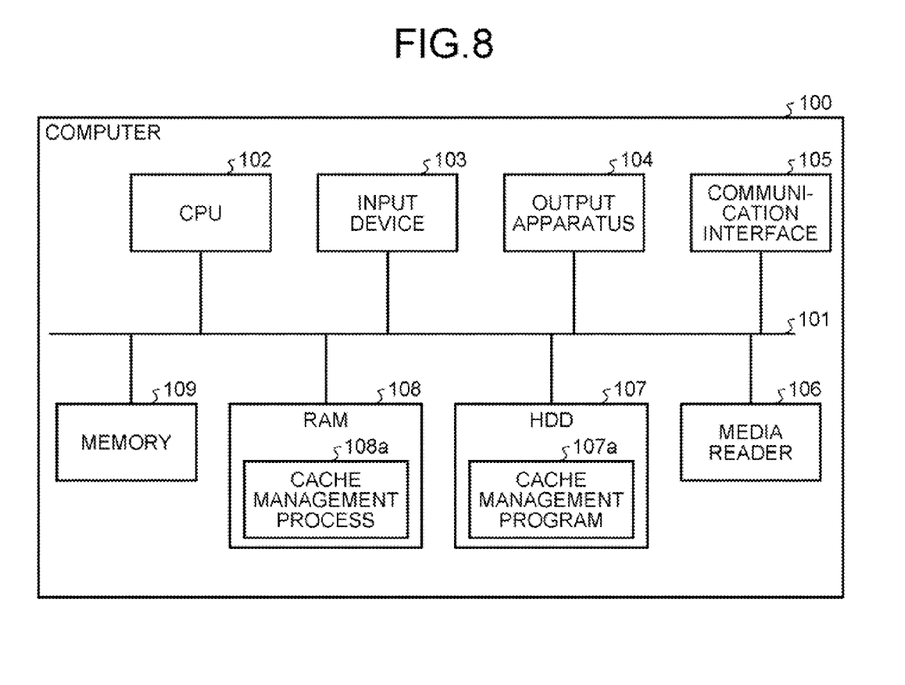
FIG. 8 is a schematic diagram illustrating an example of the hardware configuration of a computer that executes a cache management program.

FIG. 8 is a schematic diagram illustrating an example of the hardware configuration of a computer that executes a cache management program. As illustrated in FIG. 8, a computer 100 includes a CPU 102, an input device 103, an output apparatus 104, a communication interface 105, a media reader 108, a hard disk drive (HDD) 107, a random access memory (RAM) 108, and a memory 109. The units illustrated in FIG. 8 is connected to each other via a bus 101.

The input device 103 is a mouse or a keyboard; the output apparatus 104 is, for example, a display; and the communication interface 105 is an interface, such as a network interface card (NIC). The HDD 107 stores therein, together with a cache management program 107a, the tables described with reference to FIG. 2. The HDD 107 is mentioned as an example of a recording medium; however, the present invention is not limited thereto. For example, various programs may also be stored in another computer readable recording medium, such as a read only memory (ROM), a RAM, a CD-ROM, or a solid state drive (SSD) and may also be read by a computer. Furthermore, a program may also be obtained and used by arranging a storage medium at a remote site and by a computer accessing the storage medium. Furthermore, at this time, the obtained program may also be stored in the recording medium in the computer.

The CPU 102 reads the cache management program 107a and loads it in the RAM 108, and thus the cache management program 107a functions as a cache management process 108a that executes each function described above with reference to FIGS. 2 and 3. Specifically, if the computer 100 is the master node, the cache management process 108a executes the distributed processing unit 34, the name management unit 35, the global cache management unit 36, the cache management unit 37, and the process execution unit 38 illustrated in FIG. 2. Furthermore, if the computer 100 is a common node, the cache management process 108a executes the distributed processing unit 14, the cache management unit 15, and the process execution unit 16 illustrated in FIG. 3. In this way, by reading and executing the program, the computer 100 operates as an information processing apparatus that executes the cache management method.

Furthermore, the computer 100 reads the cache management program from the recording medium by using the media reader 106 and executes the read cache management program, thereby implementing the same function described in the embodiments. The program mentioned in the embodiment is not limited to the program executed by the computer 100. For example, the present invention can also be used in a case in which another computer or a server cooperatively executes the program in cooperation with the computer 100.

According to the embodiments, the processing performance can be improved.

All examples and conditional language recited herein are intended for pedagogical purposes of aiding the reader in understanding the invention and the concepts contributed by the inventor to further the art, and are not to foe construed as limitations to such specifically recited examples and conditions, nor does the organisation of such examples in the specification relate to a showing of the superiority and inferiority of the invention. Although the embodiments of the present invention have been described in detail, if should foe understood that the various changes, substitutions, and alterations could be made hereto without departing from the spirit and scope of the invention.

What is claimed is:

1. An information processing apparatus comprising:
   a memory; and
   a processor that is coupled to the memory and executes a process comprising:
   receiving a query as to whether data is stored in a page cache managed by an operating system, from an information processing apparatus that has received an access request for data from one of a plurality of information processing apparatuses in a distributed processing system in which the information processing apparatuses execute a process in a distributed manner;
   referring, when the query is received at the receiving, to a page cache managed by an operating system in the information processing apparatus;
   determining whether the data is stored in the page cache managed by the operating system; and
   responding to the received query by sending a result determined at the determining, wherein
   the determining includes calculating a total number of pages from a size of the data, and, when a ratio of the total number of pages to a number of pages stored in the page cache managed by the operating system in the information processing apparatus is equal to or greater than a predetermined value, determining that the data is stored in the page cache managed by the operating system.

2. A non-transitory computer readable storage medium having stored therein a cache management program causing a computer to execute a process comprising:
   receiving a query as to whether data is stored in a page cache managed by an operating system, from a computer that has received an access request for data from one of a plurality of computers in a distributed processing system in which the computers execute a process in a distributed manner;
   referring to a page cache managed by an operating system in the computer and determining whether the data is stored in the page cache managed by the operating system; and
   responding to the received query by sending a result determined at the determining, wherein
   the determining includes calculating a total number of pages from a size of the data, and, when a ratio of the total number of pages to a number of pages stored in the page cache managed by the operating system in the computer is equal to or greater than a predetermined value, determining that the data is stored in the page cache managed by the operating system.

* * * * *